Figure 1:
Figure 2:
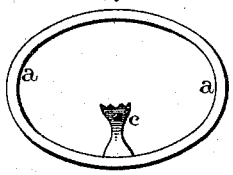

A. P. MAYHEW & I. D. LEONARD.
Scarf-Rings.

No. 143,366.                              Patented September 30, 1873.

WITNESSES.
Wm P. Johnson
W. G. Kindig.

INVENTORS.
A. P. Mayhew.
I. D. Leonard.
per
F. A. Lehmann,
atty

UNITED STATES PATENT OFFICE.

ALFRED P. MAYHEW AND ISAAC D. LEONARD, OF NEWARK, NEW JERSEY.

IMPROVEMENT IN SCARF-RINGS.

Specification forming part of Letters Patent No. 143,366, dated September 30, 1873; application filed September 15, 1873.

*To all whom it may concern:*

Be it known that we, ALFRED P. MAYHEW and ISAAC D. LEONARD, of Newark, in the county of Essex and State of New Jersey, have invented certain new and useful Improvements in Scarf-Rings; and we do hereby declare the following to be a full, clear, and exact description of the invention, such as will enable others skilled in the art to which it pertains to make and use it, reference being had to the accompanying drawings which form part of this specification.

The nature of our invention relates to an improvement in scarf-rings; and it consists in hinging to the inside of the ring a suitable catch of any kind, which will catch in the scarf and prevent the ring from slipping off.

The accompanying drawings represent our invention, being enlarged so as to better show the parts.

*a* represents a scarf-ring, of any desired shape or construction, having hinged, pivoted, or secured in any other suitable manner to its inside the catch or pronged lever *c*. This catch, having one or more sharp points on its lower end, so as to cause it to catch in the scarf, projects downward, and has its lower end curved outward, so as to allow the scarf to be freely drawn through in either direction while the catch is hanging in a vertical position; but when raised upward to a horizontal position inside of the ring, this pointed end catches in the scarf and prevents the rings from slipping down.

This catch may either be of the form and shape here shown, or any other that may be preferred, so long as it is secured or fastened to the inside of the ring and acts as a stop to prevent the ring from slipping off the scarf.

Having thus described our invention, we claim—

The combination of the ring *a* and the hinged or jointed catch *c*, substantially as specified.

In testimony that we claim the foregoing we have hereunto set our hands and seals this 11th day of September, 1873.

ALFRED P. MAYHEW. [L. S.]
  ISAAC D. LEONARD. [L. S.]

Witnesses:
 J. IRVING LEONARD,
 STEPHEN S. LEONARD.